(12) United States Patent
Moraru et al.

(10) Patent No.: US 11,128,027 B2
(45) Date of Patent: Sep. 21, 2021

(54) RFID TAG FOR HARSH ENVIRONMENT INDUCTIVELY COUPLED IN DOUBLE LOOP

(71) Applicant: PROMAR TEXTIL INDUSTRIES S.R.L., Brasov (RO)

(72) Inventors: Aurelian Moraru, Brasov (RO); Corneliu Ursachi, Brasov (RO)

(73) Assignee: PROMAR TEXTIL INDUSTRIES S.R.L., Brasov (RO)

( * ) Notice: Subject to any disclaimer, the term of this patent is extended or adjusted under 35 U.S.C. 154(b) by 0 days.

(21) Appl. No.: 16/609,260

(22) PCT Filed: Dec. 19, 2017

(86) PCT No.: PCT/RO2017/000023
§ 371 (c)(1),
(2) Date: Oct. 29, 2019

(87) PCT Pub. No.: WO2018/231083
PCT Pub. Date: Dec. 20, 2018

(65) Prior Publication Data
US 2020/0076048 A1   Mar. 5, 2020

(30) Foreign Application Priority Data
Jun. 16, 2017   (RO) .............................. a 2017 00388

(51) Int. Cl.
*H04B 5/00* (2006.01)
*H01Q 1/22* (2006.01)
(Continued)

(52) U.S. Cl.
CPC ..... *H01Q 1/2225* (2013.01); *G06K 19/07773* (2013.01); *H01Q 1/14* (2013.01);
(Continued)

(58) Field of Classification Search
CPC .. H04B 5/0062; H04B 5/0068; H04B 5/0081; H01Q 7/00; H01Q 1/40; H01Q 1/2225
(Continued)

(56) References Cited

U.S. PATENT DOCUMENTS 7,432,816 B1 * 10/2008 Ku ..................... G06K 19/0723
340/572.1
8,035,522 B2 * 10/2011 Oroku .............. G06K 19/07749
340/572.7
(Continued)

FOREIGN PATENT DOCUMENTS

DE   102007026720   12/2008
DE   102013102051    9/2014
(Continued)

OTHER PUBLICATIONS

International Search Report, International Application No. PCT/RO2017/000023, dated Jun. 7, 2018.

*Primary Examiner* — April G Gonzales
(74) *Attorney, Agent, or Firm* — The Roy Gross Law Firm, LLC; Roy Gross

(57) ABSTRACT

The invention relates to an IDRF label for use in aggressive environments. The IDRF label (1) according to the invention comprises a UIF-SIF (2) antenna made of an electrically conductive textile, electrically insulated, embroidered on a textile backing, an IDRF transponder (3) and a textile substrate (4) and the UIF-SIF antenna (2), the whole assembly being sealed by hot-dipping a second textile substrate, wherein the UIF-SIF (2) antenna has a central loop formed by a loop (5) by which it inductively couples with the encapsulated IDRF transponder 3.

6 Claims, 1 Drawing Sheet

(51) Int. Cl.
*G06K 19/077* (2006.01)
*H01Q 1/14* (2006.01)
*H01Q 1/40* (2006.01)
*H01Q 7/00* (2006.01)

(52) U.S. Cl.
CPC ................ *H01Q 1/40* (2013.01); *H01Q 7/00* (2013.01); *H04B 5/0062* (2013.01); *H04B 5/0068* (2013.01); *H04B 5/0081* (2013.01)

(58) Field of Classification Search
USPC ........................................................ 455/41.1
See application file for complete search history.

(56) References Cited

U.S. PATENT DOCUMENTS

| | | | | |
|---|---|---|---|---|
| 8,120,484 | B2* | 2/2012 | Chisholm | G06K 19/07798 340/572.1 |
| 8,334,758 | B2* | 12/2012 | Baruco | H01Q 1/32 340/12.5 |
| 8,638,193 | B2* | 1/2014 | Margalef | H01Q 9/0421 340/10.1 |
| 8,910,878 | B2* | 12/2014 | Fan | G06K 19/07794 235/492 |
| 2007/0063895 | A1* | 3/2007 | August | H01Q 7/06 342/359 |
| 2007/0095926 | A1* | 5/2007 | Zhu | G06K 19/07756 235/492 |
| 2009/0079574 | A1* | 3/2009 | Oroku | G06K 19/07749 340/572.7 |
| 2009/0321531 | A1* | 12/2009 | Speich | G06K 19/07749 235/492 |
| 2010/0051699 | A1* | 3/2010 | Speich | G06K 19/07749 235/492 |
| 2010/0177008 | A1* | 7/2010 | Bohn | G06K 19/07749 343/878 |
| 2010/0245182 | A1* | 9/2010 | Vicard | H01L 24/82 343/702 |
| 2014/0246503 | A1* | 9/2014 | Hofer | H01Q 1/38 235/492 |
| 2015/0028107 | A1* | 1/2015 | Fischer | H04B 5/0081 235/488 |
| 2016/0048751 | A1* | 2/2016 | Imbruglio | G06K 19/07754 235/492 |

FOREIGN PATENT DOCUMENTS

| | | |
|---|---|---|
| EP | 2405054 | 1/2012 |
| WO | 2012014005 | 2/2012 |
| WO | 2013128299 | 9/2013 |
| WO | 2017060652 | 4/2017 |

* cited by examiner

RFID TAG FOR HARSH ENVIRONMENT INDUCTIVELY COUPLED IN DOUBLE LOOP

RELATED APPLICATIONS

This application is a National Phase of PCT Patent Application No. PCT/RO2017/000,023 having International filing date of Dec. 20, 2018, which claims the benefit of priority of Romanian Application No. a 2017 00388 filed on Jun. 16, 2017. The contents of the above applications are all incorporated by reference as if fully set forth herein in their entirety.

A Minimum Radio Frequency Identification (RFID) system consists of a interrogator reader connected to a PC and a population of tags attached to the products they uniquely identify. An application software handles RFID information to trace and inventory these products. Passive RFID tags operating in the UIF (860-960 MHz) or SIF (2.45 GHz) frequency range are used.

Objects identified using RFID tags and intended for use in harsh environments shall withstand the following requirements:
- repeated immersion in the aquatic environment
- exposure to high temperatures of up to 200° C., more than 20 minutes
- high temperature variations—(8° C./90° C.),
- corrosive chemicals
- mechanical pressures of 40-60 bar,
- repeated mechanical stresses (bending, pressing, etc.)
- number of cycles of use greater than 300

From a historical point of view, for RFID applications, passive RFID tags operating in the HF domain (13.65 MHz) were used first. Constructively, they were made up of an integrated circuit galvanically connected to a multi-spiral coil. The reading range was under one meter, and the reading speed was about one label per second. With the introduction of passive RFID tags operating in the UHF range, and with the development of communications protocols, performance has increased spectacularly at high read speeds (10 RFID tags/sec) and read ranges of up to 7 m.

For textile tracking applications, the design of an RFID tag composed of a capsulated traponder, thus protected by the harsh environment of industrial laundries, and a UHF antenna made of metallic wire, has been widely adopted. The encapsulated transponder contains an integrated circuit and a near-field antenna by which it is inductively coupled to a segment of the UHF antenna.

This category includes the RFID UHF tags, the subject of patents EP 2405054 A1, DE 102007026720 A1, US 20090079574 A1.

But even this design has its limits. Capsulation is achieved by protecting the contacts between the integrated circuit (IC) pins and the near field antenna terminals, but at the UHF antenna there are major discrepancies relative to the mechanical and thermal characteristics of the textile substrate relative to the metallic conductors of the UHF antenna. Here's a short list of problems with using these labels in industrial laundries:
- loosening the seams and breaking the textile fabric, to which the RFID tag is attached,
- the metal wire from which the UHF antenna is made oxidizes in contact with the water and the oxidant chemicals used in the washing process, stains the fabric and compromises its appearance. Also due to oxidation the electrical parameters of the antenna material, and implicitly its electromagnetic performances, are affected.
- the material of the metal wire from which the antenna is made stores much more thermal energy than the textile support, this difference leading to the piercing/perforation of the textile material by the metal wire of the antenna that protrudes out of it.
- because of the rigidity of the metal wire, the entire tag is a little flexible compared to the textile material from which the article to be identified is being made. Low flexibility creates break lines on the RFID tagline.

These lead to the detachment of the encapsulated RFID transponder 3 and consequently to the loss of the identity of the textile objects being monitored, to the appearance problems of the textile item, but especially to the problems for the customers, respectively their injury to the use of textile articles (towels, pillows, sheets) that were pierced by the metal wires.

At the same time, current UHF tags have considerable dimensions that make them inappropriate, unsightly for identifying small items (tablecloths).

The ideal passive RFID tag for the identification of textile items that are maintained in laundries and dry cleaners is:
- electromagnetic performance (high reading distance),
- of small size,
- flexible and resistant to bending,
- resistant to chemical stress,
- resistant to a number of exposures greater than the product it identifies, over 200 washing cycles.

So an electromagnetically performant, resistant and discreet RFID tag.

The ways to approach this ideal prototype are:
- the use of encapsulating materials to effectively protect the integrated circuit and its contacts with the near field antenna at the transponder level,
- designing a UHF/SHF antenna geometry to give it superior electromagnetic properties and at the same time to have as small a size as possible,
- use of electrically conductive materials with mechanical parameters close to the textile, to the construction of the UHF/SHF antenna
- tag components that are in direct interaction, have close thermal expansion coefficients.

The UHF antennas of the RFID tags available on the market are made of electrically insulated metallic wire, attached to a textile support by sewing or embroidering. They have the meandered shape (EP 2405054 A1), or crossed loops (WO 2013128299 A1). All have the vulnerabilities and limitations described in paragraph [0006].

The present invention overcomes the aforementioned drawbacks associated with prior art solutions by providing a tag having the features mentioned in the independent claim 1.

Other preferred features of the present invention are set forth in the appended dependent claims.

The present invention proposes for the UHF-SHF antenna an electroconductive yarn made of metallic stainless steel wire that resists the action of oxidizing agents. By using the electroconductive textile wire to make the UHF-SHF antenna, due to its flexibility, the electroconductive textile thread allows for the realization of geometries impossible to achieve with an electrically isolated metal wire. It is possible to make very small radius curves without creating mechanical stresses in the tag structure. Also the UHF-SHF antenna made of electroconductive textile thread is very discreet and does not feel, it naturally integrates into the textile material of the product it identifies.

Other features and advantages of the present invention will become more apparent from the following detailed description, given in connection with the accompanying drawings, in which.

The UHF-SHF antenna 2 has a particularly innovative geometry characterized in that it has in the central region a double loop 5 through which an efficient inductive coupling with the encapsulated RFID transponder 3 is provided, thereby obtaining an electromagnetically efficient RFID tag.

The double loop 5 also allows for a small, discreet and easy-to-integrate RFID tag even in small-sized textile articles.

Figure 1:
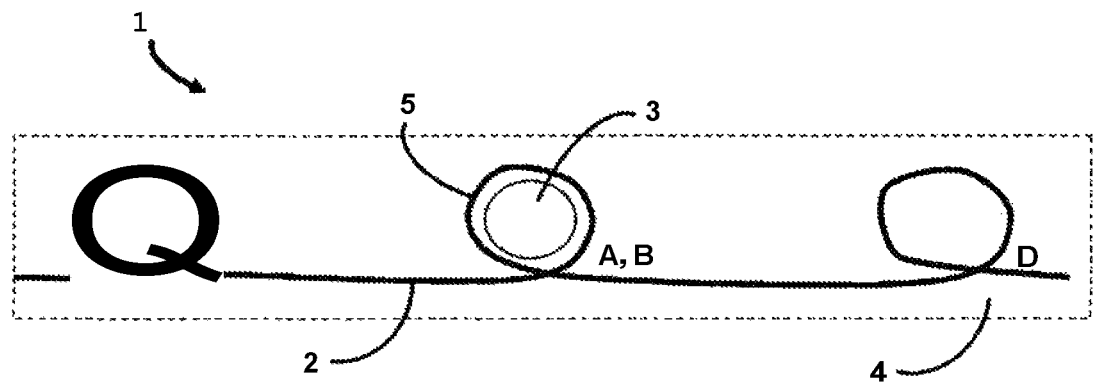
FIG. 1 shows a schematic view of the double-loop RFID tag according to a first embodiment of the invention.
Figure 2:
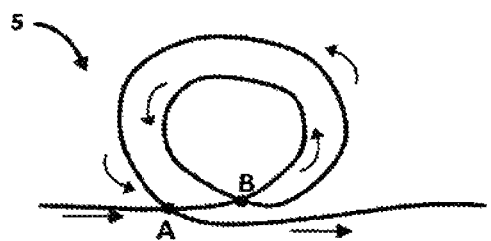
FIG. 2 shows a the double loop in detail according to the first embodiment of the invention.
Figure 3:
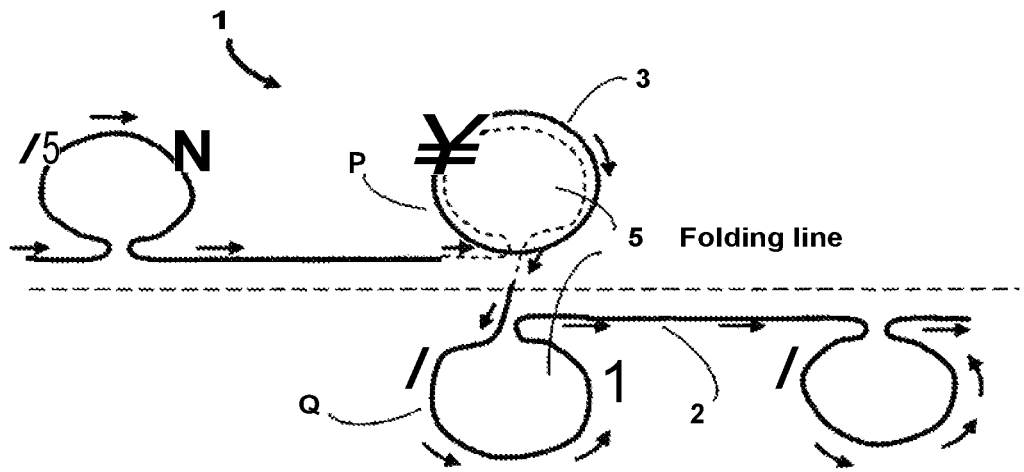
FIG. 3 shows a schematic view of the double-loop RFID tag according to a second embodiment of the invention.

The RFID passive UHF-SHF antenna can be made in two variants FIG. 2 and FIG. 3. In the first embodiment, FIG. 2, the electroconductive textile thread is electrically insulated and allows the thread overlapping at certain points (A, B, C, D) without electrical contact. For the second embodiment, FIG. 3, the UHF-SHF antenna geometry allows the use of a non-insulated electroconductive textile thread. Both variants are embroidered.

In the first embodiment, FIG. 2, the double loop 5 of the UHF antenna 2 through which the inductive coupling with the encapsulated RFID transponder 3 is made, has created an UHF antenna with efficient power transfer and information integrity, with substantially reduced design dimensions. There is no electrical contact at points A, B, C, and D.

In the second embodiment of the UHF-SHF antenna, FIG. 3, the drawing of the embroidery is made so that the electroconductive textile thread is continuously embroidered without crossings in its path.

After embroidering, by bending over the dotted line and overlapping the two P and Q loops, a double loop (5) will form. The loop P has a smaller diameter than the Q loop. It is noted that, after bending and overlap, the currents in the two loops have the same direction, contributing together to an efficient inductive coupling. Prior to bending between the two loops P and Q, the encapsulated transponder (3) will be fixed with adhesive on the loop P. After folding and overlapping the encapsulated transponder (3) will be secured between the two loops P and Q.

The present invention is complementary to patent No. a 2016 00791, which proposed an RFID Transponder designed to operate in aggressive environments. The RFID transponder was described as being designed to be used both independently for RFID applications for which the reading range is in centimeters and with a UHF-SHF antenna for RFID applications for which the reading range is of meters order.

The design of this tag by embedding in its structure the encapsulated transponder 3, object of the patent a 2016 00791, overcomes the problems created by the dimensional discrepancies between tiny integrated circuits and the antennas, they are galvanically connected, which require the use of expensive technologies (wire bonding) or inadequate to the harsh environment of industrial laundry (bonding with conductive adhesives).

The tag design looks for a straight measure relative to the dimensions of the objects it identifies and the size of the tag. It does not fall into excessive miniaturization when it is not necessary.

A maximal design is proposed for the maximum achievable design with the currently available components, keeping the measure.

transponder with a minimum number of galvanic contacts, equal to the number of active, integrated circuit pins, robust galvanic contacts using an integrated circuit in SOT323 package, welded in the cheap and mature SMT technology, at the near-field antenna terminals, encapsulated and thus protected from the harsh environment of industrial laundry, inductive coupling between encapsulated transponder (3) and UIF-SIF antenna (2), the homogeneity of the components of the UIF-SIF antenna (2)—textile substrate and the antenna, both of textile material, substantially reduced length of the tag by using the double loop of the UHF-SHF antenna.

a tag born and not made for the textile world by the materials used (textile thread on a textile substrate), and the methods of making (embroidering the textile thread on the textile substrate).

Referinţe bibliografice

| Brevet citat | Data înregistrării | Data publicării | Solicitant | Titlul |
|---|---|---|---|---|
| EP 2405054 A1 | 07 Iulie 2010 | 11 Ianuarie 2012 | Datamars SA (CH) | Textile item identification tag |
| DE 102007026720 A1 | 06 Iunie 2007 | 11 Decembrie 2008 | Bielomatik | Chip module for an RFID system |
| US 20090079574 A1 | 19 Septembrie 2008 | 26 Martie 2009 | Noriyuki | Rfid tag |
| WO 2013128299 A1 | 02 Martie 2012 | 06 Septembrie 2013 | Usta | Enhanced antenna structure for RFID tags |

The invention claimed is:

1. An RFID tag (1) for use in harsh environments comprising;
   an UHF-SHF antenna (2) made from a continuous electroconductive textile thread, electrically insulated, embroidered on textile substrate,
   an RFID transponder (3), and
   a substrate of textile material (4) on which the RFID transponder (3) and the UHF-SHF antenna (2) are placed, the whole assembly being sealed by hot-dipping of a second textile substrate,
   wherein the UHF-SHF antenna (2) has a central zone formed by a double loop (5) by which it inductively couples with the encapsulated RFID transponder (3), wherein the double loop (5) does not have electrical contacts at intersection points (A and B).

2. The RFID tag (1) of claim 1, wherein the UHF-SHF antenna (2) is made of an electroconductive textile thread, electrically insulated, by continuous embroidering, starting from one end to the other, and has simple loops in each extremity, and in the central area a double loop (5) consisting of a first loop with a smaller diameter, followed by a second concentric loop with a larger diameter.

3. The RFID tag (1) of claim 1, wherein the UHF-SHF antenna (2) does not show electrical contacts in the crossing points (C and D) in the construction of simple loops located at the extremities.

4. The RFID tag (1) of claim 1, wherein the UHF-SHF antenna (2) is made by continuous embroidering of the electroconductive textile thread in the form of two open loops disposed in a upper plane in relation to a longitudinal direction and two open loops disposed in a lower plane in relation to the same longitudinal direction.

5. The RFID tag (1) of claim 4, wherein, in the central area, an upper plane loop (P) has a smaller diameter than a loop (Q) from the lower plane, the transponder (3) being fixed and centered on the loop (P) in the upper plane, and the loop (Q) from the lower plane will overlap the loop (P) from the upper plane by bending over said longitudinal direction, so that the double loop (5) is created having the transponder (2) inside it.

6. The RFD tag (1) of claim 1, wherein the harsh environments include temperatures between 8-90° C.

* * * * *